United States Patent [19]

Ricks

[11] Patent Number: 5,624,130
[45] Date of Patent: Apr. 29, 1997

[54] AIR BAG INFLATOR FOR SNAP-ACTION ATTACHMENT TO A STEERING WHEEL

[75] Inventor: Merle K. Ricks, Layton, Utah

[73] Assignee: Morton International, Inc., Chicago, Ill.

[21] Appl. No.: 505,793

[22] Filed: Jul. 21, 1995

[51] Int. Cl.$^6$ .................... B60R 21/20; F16B 21/08
[52] U.S. Cl. .................... 280/728.2; 280/731; 411/508; 24/453; 24/704.1
[58] Field of Search ............... 280/728.2, 731, 280/732, 730.1, 728.1; 411/508, 509, 510, 913; 24/453, 704.1, 694, 618, 628

[56] References Cited

U.S. PATENT DOCUMENTS

| | | | |
|---|---|---|---|
| 3,842,709 | 10/1974 | Fuqua | 411/508 |
| 4,785,144 | 11/1988 | Fosnaugh et al. | 280/731 |
| 4,913,461 | 4/1990 | Cuevas | 280/731 |
| 5,087,069 | 2/1992 | Corbett et al. | 280/731 |
| 5,207,544 | 5/1993 | Yamamoto et al. | 280/728.2 |
| 5,333,897 | 8/1994 | Landis et al. | 280/728.2 |
| 5,380,037 | 1/1995 | Worrell et al. | 280/728.2 |

*Primary Examiner*—Brian L. Johnson
*Assistant Examiner*—Peter C. English
*Attorney, Agent, or Firm*—Philip C. Peterson; Steven C. Benjamin; Gerald K. White

[57] ABSTRACT

An air bag inflator module adapted for quick action, snap-action, permanent attachment onto a support in a motor vehicle, such as a steering wheel. Installation of the module on the support requires the use of no tools. The module has a base facing and movable toward the support. A fastening system is provided including a plurality of quick action, snap-action type fasteners extending between the base and the support. Either the base or the support includes openings for receiving a first portion of the fasteners extended therethrough as the module is pushed into place on the support with a unidirectional thrust. Each fastener also includes a second portion permanently mounted on the other of the base or the support opposite the opening for supporting the first portion projecting outwardly thereof. A snapaction expandable holding device is provided on the first portion of each fastener for engaging an opposite surface on the base or support after insertion through the opening. Each fastener is releasable using an ordinary hand tool such as a screw driver for disconnection of the threaded first and second portions for permitting the inflator module to be bodily removed or detached from the support. Thereafter, the module can be reattached or remounted on the support again using an ordinary hand tool after reassembly of the disconnected first and second portions of each fastener and then pushing the module again into place on the support.

34 Claims, 2 Drawing Sheets

1

AIR BAG INFLATOR FOR SNAP-ACTION ATTACHMENT TO A STEERING WHEEL

BACKGROUND OF THE INVENTION

1. Field of the Invention

The present invention relates to air bag inflators generally and more particularly to an air bag inflator module which can be quickly mounted in place on a vehicle steering wheel or other support in a motor vehicle without requiring the use of tools utilizing quick-acting or snap-action fasteners for permanent attachment, and including a release system so that the module can be removed for service and/or replacement. The present invention is particularly designed for providing easy and quick mounting of an air bag inflator module on a vehicle steering wheel by merely pushing the air bag module into place until fasteners are locked to permanently secure the module to the steering wheel. The fasteners permanently retain the air bag module in place and are well able to withstand shock forces, velocities and stresses during air bag deployment. The fasteners are releasable using an ordinary hand tool so that the air bag module may be removed from the steering wheel or other support for service and/or replacement, and thereafter the module can be remounted or reinstalled on the vehicle support, again using only an ordinary hand tool such as a screw driver.

2. Background of the Prior Art

A break-away fastening system for air bag deployment doors is disclosed in copending U.S. patent application Ser. No. 08/286,823, filed Aug. 5, 1994. The fasteners utilized in the fastening system disclosed are designed to fracture upon air bag deployment so that the doors are released to open whereas the fasteners of the present invention are designed to retain the whole air bag inflator module in place on the steering wheel or other supporting element during air bag deployment, but are manually releasable when desired, so that the air bag module may be removed for service and/or replacement.

OBJECTS OF THE INVENTION

The present invention has an object to provide a new and improved air bag inflator module adapted for quick action, snap-action mounting or attachment to a vehicle support or steering wheel without requiring the use of tools.

It is another object of the present invention to provide a new and improved air bag inflator module of the character described which can be released from attachment after mounting in place so that the inflator can be removed for service and/or replacement.

Yet another object of the present invention is to provide a new and improved air bag inflator module of the character described which can be permanently mounted on a vehicle steering wheel by pre-positioning the air bag module directly in front relative to a steering wheel or other support in a motor vehicle and then merely pushing the module into place to lock snap-action fasteners for permanently securing the air bag inflator module in place.

Still another object of the present invention is to provide a new and improved air bag inflator module of the character described employing fasteners which can be released with an ordinary hand tool such as a screw driver for permitting the air bag inflator module to be removed for servicing and/or replacement.

Yet another object of the present invention is to provide a new and improved air bag inflator module of the character described which can be reattached or remounted on the vehicle support after removal using an ordinary hand tool such as a screw driver.

Yet a further object of the present invention is to provide a new and improved air bag inflator of the character described wherein a fastening system for attaching or mounting the air bag inflator module on the vehicle steering wheel or other support is strong enough to withstand shock forces, velocities and stresses developed during air bag deployment and positively retain the module in place.

BRIEF SUMMARY OF THE PRESENT INVENTION

The foregoing objects and advantages of the present invention are accomplished in a new and improved air bag inflator module adapted for quick action, snap-action, permanent mounting or attachment onto a support provided in a motor vehicle such as a steering wheel. Installation of the inflator module requires the use of no tools for permanent installation on the support and the module includes a base facing and movable in one direction directly toward the support for establishing a permanent fixed attachment thereto. A fastening system including a plurality of quick action, snap-action type fasteners is provided extending between the base and the vehicle support for securing the inflator module permanently locked in place. The base of the module or the vehicle support is provided with openings for receiving a first portion of the fasteners extended therethrough as the inflator module is pushed into place on the steering wheel with a unidirectional thrust. Each fastener includes a second portion permanently mounted on the base or the support opposite an opening for supporting the first portion of the fastener projecting outwardly thereof. A snap-action holding or locking device is provided on the first portion of each fastener for engaging an opposite surface on the base or the support, as the case may be, after the first portion of the fastener is inserted through an opening. The holding device expands after insertion to engage the opposite side of the base or vehicle support for permanently retaining the fastener in interconnecting relation therebetween. Each fastener is releasable using an ordinary hand tool such as a screw driver for disconnection of the first and second portions thereof for permitting the inflator module to be bodily removed or detached from the support. Thereafter, the module can be reattached or remounted on the support again using an ordinary hand tool for interconnecting the first and second portions of each fastener.

BRIEF DESCRIPTION OF THE DRAWINGS

For a better understanding of the present invention, reference should be had to the following detailed description taken in conjunction with the drawings, in which.

DETAILED DESCRIPTION OF A PREFERRED EMBODIMENT OF THE INVENTION

Figure 2:
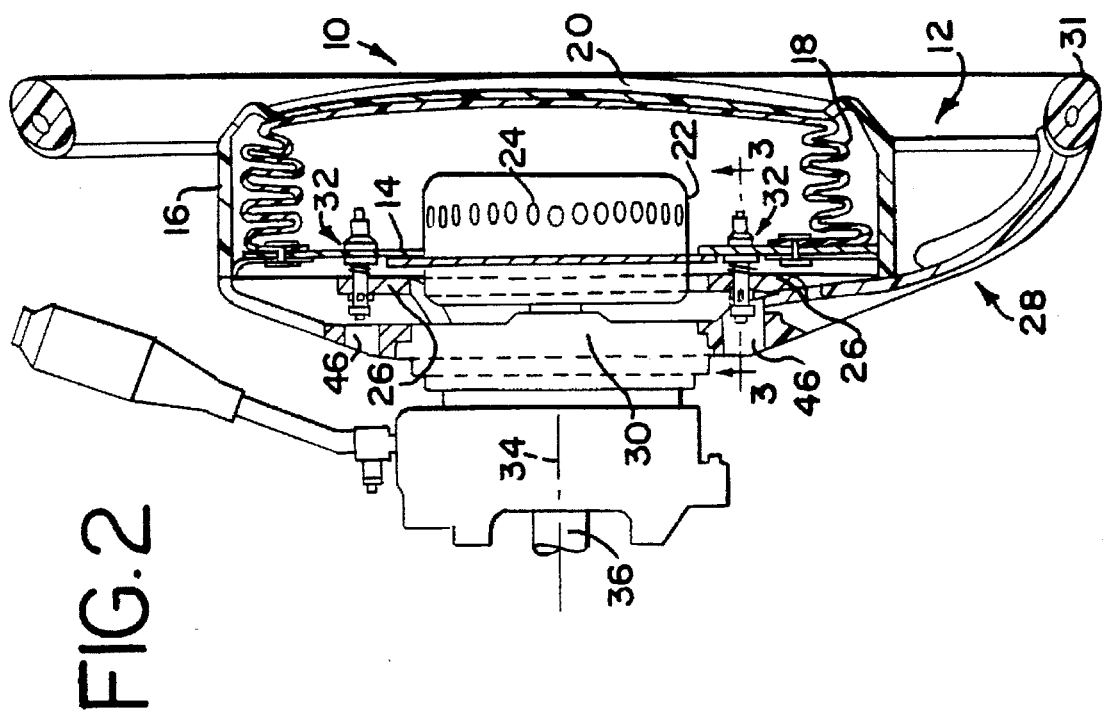
FIG. 2 is a cross-sectional view illustrating the air bag inflator module after being permanently mounted in place on the steering wheel.
Figure 1:
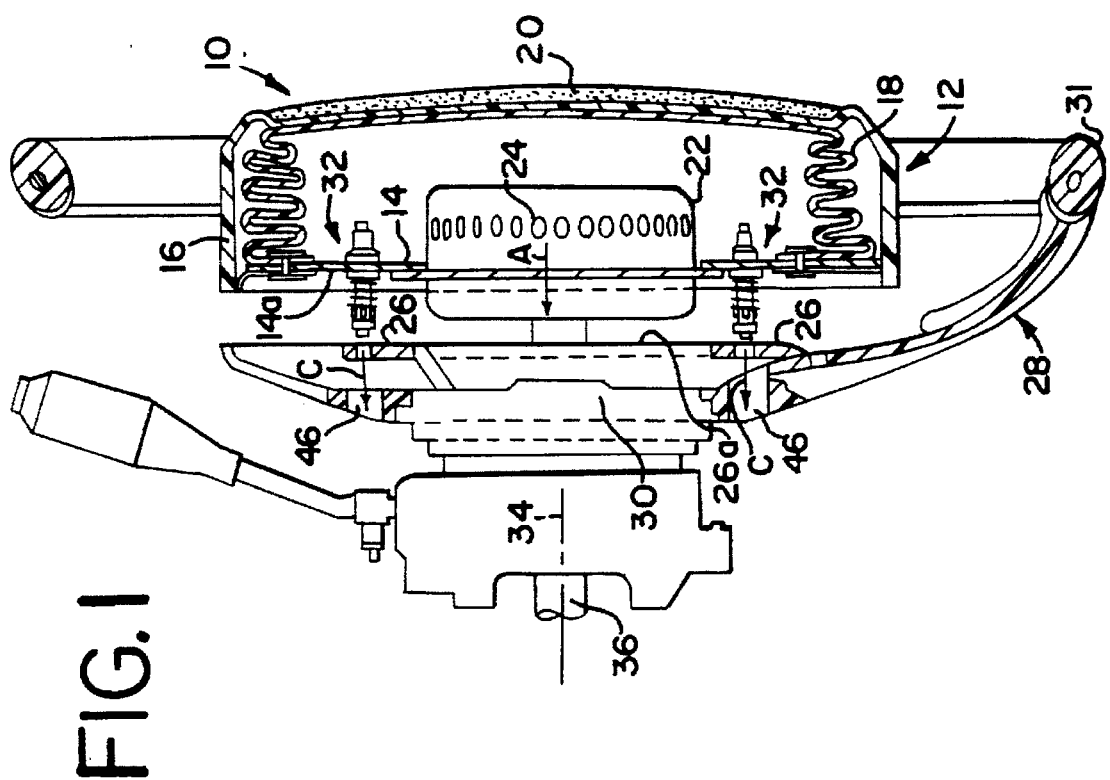
FIG. 1 is a cross-sectional view of a new and improved air bag inflator module designed for quick action, snap-action permanent mounting or attachment onto a vehicle support or steering wheel constructed in accordance with the features of the present invention and illustrated as it is pre-positioned adjacent a vehicle steering wheel ready for mounting thereon with a unidirectional push or thrust.

Referring now more particularly to the drawing, in FIGS. 1 and 2 is illustrated a new and improved air bag inflator module 10 constructed in accordance with the features of the present invention. The inflator module 10 includes a housing 12 having an annular base 14 joined around the periphery with a side wall 16 forming a protective enclosure for a folded up inflatable air bag 18. At an outwardly facing peripheral edge the housing side wall 16 is joined with a frangible cover 20 designed to open when the air bag 18 is rapidly inflated. Centrally located on the annular base is an inflator canister 22 containing solid gas generant material and having a plurality of gas discharge ports 24 arranged in a ring designed to rapidly discharge the gas that is generated to rapidly inflate the air bag 18 in an emergency.

In accordance with the present invention, the air bag inflator module 10 is designed to be quickly permanently mounted or attached onto a support plate or support elements 26 provided on a steering wheel 28 of a motor vehicle or other vehicle supporting element such as a peripheral edge portion around a panel opening when provided for a passenger side type of inflator module. The support elements 26 extend from a central hub portion 30 inside of an outer rim 31 of the steering 14a wheel 28 and provide surfaces 26a directly facing an outside surface 14a of the housing base 14 as shown in the drawing in FIGS. 1 and 3.

In accordance with the present invention, the air bag inflator module 10 is designed to be permanently mounted or attached to the support elements 26 of the vehicle steering wheel 28 by first pre-positioning the module with the base 14 directly facing the support elements 26 (FIG. 1) and then without requiring any tools, pushing or thrusting the module 10 toward the central portion of the steering wheel in one direction generally normal to surfaces 26a and 14a as indicated by the Arrow "A" in FIG. 1 until reaching the fully mounted position of FIG. 2.

In order to secure the air bag inflator module 10 in place as shown in FIG. 2, there is provided a fastening system including a plurality of elongated fasteners 32 (FIG. 3) extending directly between the base 14 and the support elements 26 and aligned generally normal or perpendicular to the surfaces 14a and 26a. Preferably, the fasteners 32 are spaced equilaterally around a central axis 34 of a steering column 36 supporting the steering wheel 28.

Figure 3:
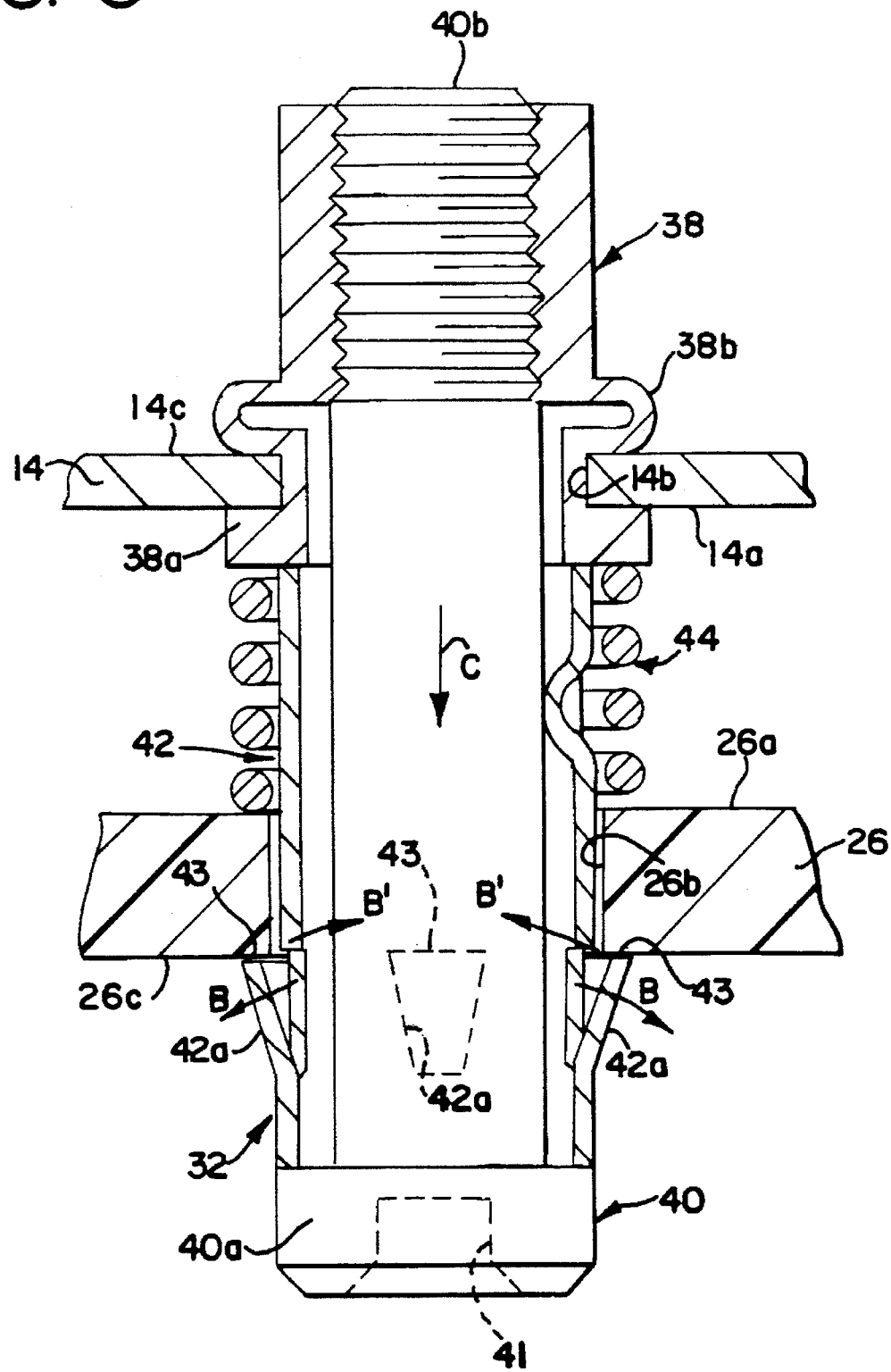
FIG. 3 is an enlarged, fragmentary cross-sectional view taken substantially along line 3—3 of FIG. 2 illustrating one of the fasteners of the fastening system of the inflator module after mounting on the vehicle steering wheel.

The base 14 of the air bag inflator module 10 is formed with a plurality of openings 14b, one for each fastener 32, and the support elements 26 are provided with matching openings or apertures 26b as best shown in FIG. 3. Each fastener 32 comprises a quick-acting, snap-action, unidirectional, self-locking type employing an internally threaded, open-ended hollow sleeve or base 38 fixedly mounted and secured against rotation on the base 14 in an opening 14b and held in place by an end flange 38a facing the adjacent support surface 26a and a radially outwardly projecting upset ring 38b formed to engage an opposite side or inside surface 14c of the module base 14. One suitable type of sleeve or base 38 is manufactured and sold under the trademark RIVNUT and known as a rivet nut, however, other types of nuts with an internally threaded central bore and fixedly attached to the base 14 by staking or welding may be used. Each fastener 32 also includes a bolt 40 having an enlarged head 40a at one end and an elongated, threaded shank 40b of smaller diameter threadedly engaged with the internally threaded fixedly mounted base or sleeve 38. The bolt head 40a is formed with a slot or recess 41 in the outer surface for receiving the tip of a screw driver used for tightening or loosening the bolt 40 in the sleeve 38 when required. The head 40a has a diameter less than that of the opening 26b in the support elements 26 so as to easily pass through the opening.

Between the underside of the head 40a and the flange 38a of the base sleeve 38, each fastener 32 is provided with a generally cylindrical, hollow metal tube or sleeve 42 surrounding the threaded shank 40b and formed with a plurality of equilaterally spaced, upwardly and outwardly sloping locking tabs 42a (as viewed in FIG. 3) struck from the body of the sleeve in a region adjacent the head of the bolt 40. A coiled compression spring 44 may be mounted on the sleeve 42 to prevent rattle and has one end bearing upwardly against the flange 38a and an opposite end bearing downwardly against the surface 26a of the support elements 26 for biasing these elements and the base 14 away from one another. The spring 44 has an outer diameter larger than that of the opening 26b of the support elements 26 so that the spring will not move into the opening when the fastener 32 is thrust toward the steering wheel 28 during mounting of the air bag module 10 in place.

In accordance with the present invention, the locking tabs 42a normally extend radially outwardly to an extent greater than the inside diameter of the opening 26b and the tabs are compressed radially inwardly (Arrows "B'") as the fasteners 32 are thrust (Arrows "C") into the openings 26b of the support elements 26 until upper free edges 43 of all tabs are past or on opposite surface 26c or back side of the support elements. At this time the tabs 42a are free to snap back radially outwardly (Arrows "B") to the locking or holding position as shown in FIG. 3 wherein the upper edges 43 positively engage the back side surface 26c of the support elements 26 to lock and hold the air bag module 10 permanently in place as shown in FIGS. 2 and 3.

It is thus seen that the fasteners 32 provide for permanent attachment or mounting of the air bag module 10 on the steering wheel 28, with a simple unidirectional thrust (Arrow "A") until all of the tabs 42a snap into locked position. The springs 44 which are made of metal or a polymer rubber prevent rattle and can be located elsewhere on the module 10 such as the corners between the base 14 and the support element 26. The springs 44 maintain tension on the fastener bolts 40 to prevent rattling and ensure that locking engagement of the tabs 42a and the support elements 26 is maintained. Moreover, the fasteners 32 provide sufficient holding strength so that when the air bag 18 is deployed to inflate the module base 14 and components mounted thereon remain in place on the steering wheel 28.

After initial mounting of the air bag inflator module 10 onto the vehicle steering wheel 28 as previously described, if it is desired to disconnect, release and remove the module for service, repair and/or replacement, each fastener 32 may be disassembled or released by unthreading the bolt 40 from the fixed sleeve or nut 38 using only an ordinary screw driver by turning the bolt until completely unthreaded from the sleeve. After all of the fasteners 32 have been so disassembled, the air bag inflator module 10 can be easily removed from the steering wheel 28. If after such removal is completed, another or the same air bag inflator module 10 is to be reassembled or mounted on the steering wheel 28, remounting or reinstallation is readily accomplished with an ordinary screw driver applied to turn the heads 40a of the bolts 40 until the threaded shanks 40b engage the internally threaded fixed sleeves or nuts 38 to the relative position shown in FIG. 1. Once this is done, the module 10 is again thrust into place as shown by arrow A to the position shown in FIG. 2 and is again positively secured in place on the sterring wheel 28. To accommodate and provide access to the heads 40a of each fastener 32 for a screw driver, a back portion of the steering wheel 28 is formed with an access opening 46 coaxially aligned with each fastener.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A fastening system for an air bag inflator module adapted for snap-action attachment onto a support provided in a motor vehicle therefor, said fastening system comprising:

an air bag inflator module having a base facing and movable directly toward a support provided in a motor vehicle for fixed attachment thereto; and at least one snap-action fastener extending between said base and the support, one of said base and the support having an opening for receiving a first portion of said at least one fastener extended therethrough and the other of said base and the support having a second portion of said at least one fastener permanently mounted thereon for supporting said first portion projecting outwardly of said one of said base and the support, holding means on said first portion of said at least one fastener for engaging a surface of said one of said base and the support after extension of said first portion of said at least one fastener through said opening for retaining said at least one fastener in interconnecting relation between said base and the support, biasing means on said first portion of said at least one fastener between said base and the support for urging said base and the support apart after said holding means is engaged, said biasing means including a resilient compression spring mounted on said first portion having opposite ends bearing against said base and the support, and release means for disconnecting said first and second portions of said at least one fastener for permitting said inflator module to be detached from said support.

2. The fastening system of claim 1, wherein:

said holding means is compressible in order to pass through said opening and is expandable after passage to move into engagement with said surface.

3. The fastening system of claim 2, wherein:

said holding means is compressed by passage through said opening in one direction and is expanded after passage to prevent withdrawal in an opposite direction.

4. The fastening system of claim 2, wherein:

said holding means comprises a hollow cylindrical sleeve on said first portion of each fastener having one end engageable with said second portion thereof and an opposite end portion of said cylindrical sleeve having at least one spring tab struck outwardly of a body thereof to normally project radially outwardly until compressed, said at least one spring tab having a free edge for holding engagement against said one of said base and the support.

5. The fastening system of claim 4, wherein:

a plurality of said tabs are provided in spaced apart equilateral array around said body of said cylindrical sleeve, said tabs being compressible radially inwardly during passage of said first portion of said at least one fastener through said opening and snapping radially outwardly into a locking position after said free edges of said tabs have passed through said opening.

6. The fastening system of claim 5, wherein:

said free edges of said tabs extend outwardly beyond adjacent edges of said opening before and after passage therethrough.

7. The fastening system of claim 1, wherein:

said opposite ends of said spring are engageable with said second portion of said at least one fastener and the support.

8. The fastening system of claim 1, wherein:

said release means comprises threads on said first portion engageable with threads on said second portion of each fastener whereby relative rotation of said threads causes said first and second portion to move toward and away from each other.

9. The fastening system of claim 8, wherein:

said first portion of each fastener is provided with receiving means for accommodating a tool engageable therewith for rotating said threads thereof relative to said threads of said second portion.

10. The fastening system of claim 1, wherein said release means comprises threadedly engagable threaded surfaces on said first and second portions of said at least one fastener movable into and out of threaded engagement between an engaged holding position and a disengaged release position respectively.

11. The fastening system of claim 1, wherein:

unthreading of one of said threaded surfaces from the other permits release of said inflator module from said support.

12. The fastening system of claim 1, wherein:

said spring between said base and said support urges said base and said support apart for prevention of rattling.

13. The fastening system of claim 12, wherein:

said spring comprises a metal spring.

14. The fastening system of claim 12, wherein:

said spring comprises a rubber spring.

15. In combination, an air bag inflator module and a support therefor in a motor vehicle, comprising:

an air bag inflator module base adapted to be attached to the support upon movement toward said support in a direction generally normal thereto, at least one of said base and the support having at least one fastener opening therein;

at least one fastener assembly extending between said base and the support in said generally normal direction;

said at least one fastener assembly including, first means fixedly attached to one of said base and said support, said first means including a hollow internally threaded sleeve element;

second means supported by said first means to extend outwardly toward said at least one fastener opening, said second means including an elongated threaded bolt element having a shank in threaded engagement with said threaded sleeve element;

holding means on said second means movable along said generally normal direction to pass through said at least one fastener opening and expandable after passage to move into holding engagement with one of said base and said support; and release means comprising relative rotation of said threaded sleeve element and threaded bolt element for permitting said first and second means to disconnect so that said inflator module may be separated from said support.

16. The combination of claim 15, wherein:

said first means of said fastener assembly is fixedly mounted on said base; and said opening is provided on said support for receiving said second means of said fastener assembly extended therethrough.

17. The combination of claim 16, wherein:

said elongated threaded bolt element has an enlarged head at an outer end away from said threaded hollow sleeve elements with means for turning the head provided thereon.

18. The combination of claim 17, wherein:

said holding means of said fastener assembly includes a hollow cylindrical tube mounted on said shank, engageable with said threaded sleeve element at one end and engageable with said head at an opposite end.

19. The combination of claim 18, wherein:

said cylindrical tube is formed with at least one locking tab struck therefrom at a portion adjacent said head and having a free outer edge for locking engagement with a surface of said support after said at least one tab has passed through said opening.

20. The combination of claim 19, wherein:

said free outer edge of said at least one tab is formed to normally extend radially outwardly of said cylindrical tube and is compressible radially inwardly during passage thereof through said opening.

21. The combination of claim 20, wherein:

a plurality of said tabs are provided equilaterally spaced apart around said tube.

22. The combination of claim 21, wherein:

said free outer edge of each of said plurality of tabs snaps radially outwardly into locking engagement with said surface after passage thereof through said opening.

23. The combination of claim 22, wherein:

said free outer edge of each of said plurality of tabs in said locking engagement position is positioned outwardly of said opening on said engaged surface of said support.

24. The combination of claim 23, wherein:

said at least one fastener assembly further comprises spring biasing means mounted on said second means having opposite ends bearing against said base and the support for urging said base and the support apart after said holding means is engaged.

25. A snap-action fastener adapted for insertion through an opening to releasably attach an air bag module to a support provided in a motor vehicle, comprising:

first means including a hollow internally threaded sleeve element and fixed attachment means for permanently mounting;

second means supported by said first means and extending outwardly therefrom, said second means including an elongated threaded bolt element having a shank in threaded engagement with said threaded sleeve elements;

holding means on said second means for insertion through an opening and expandable after passage to move into holding engagement; and release means comprising relative rotation of said threaded sleeve element and threaded bolt element for permitting said first and second means to disconnect after said holding means is engaged.

26. The fastener of claim 25, wherein:

said first means of said fastener assembly is fixedly mounted with said fixed attachment means on a base of an air bag module; and an opening is provided on a support provided in a motor vehicle for receiving said second means when extended therethrough.

27. The fastener of claim 25, wherein:

said elongated threaded bolt element has an enlarged head at an outer end away from said threaded hollow sleeve element with means for turning the head provided thereon.

28. The fastener of claim 27, wherein:

said holding means includes a hollow cylindrical tube mounted on said shank engageable with said threaded sleeve sleeve at one end and engageable with said head at an opposite end.

29. The fastener of claim 28, wherein:

said cylindrical tube is formed with at least one locking tab struck therefrom at a portion adjacent said head and having a free outer edge for locking engagement after said at least one tab has passed through said opening.

30. The fastener of claim 29, wherein:

said free outer edge of said at least one tab is formed to normally extend radially outwardly of said cylindrical tube and is compressible radially inwardly during passage thereof through said opening.

31. The fastener of claim 30, wherein:

a plurality of said tabs are provided equilaterally spaced around said tube.

32. The fastener of claim 31, wherein:

said free outer edge of each of said plurality of tabs snaps radially outwardly into locking engagement after passage thereof through said opening.

33. The fastener of claim 32, wherein:

said free outer edge of each of said plurality of tabs in said locking engagement position is positioned outwardly of said opening.

34. The fastener of claim 29, wherein:

a spring biasing means is mounted on said cylindrical tube between said free outer edge of said at least one tab and said threaded sleeve element.

* * * * *

UNITED STATES PATENT AND TRADEMARK OFFICE
CERTIFICATE OF CORRECTION

PATENT NO. : 5,624,130
DATED : April 29, 1997
INVENTOR(S) : Merle K. Ricks

It is certified that error appears in the above-indentified patent and that said Letters Patent is hereby corrected as shown below:

```
Col. 6, Ln. 30, correct "claim 1" to read -- claim 10 -- .
Col. 7, Ln. 14, correct "elements" to read -- element -- .
Col. 8, Lns. 2-3, correct "elements" to read -- element -- .
Col. 8, Ln. 28, correct "sleeve sleeve" to read -- sleeve element--.
```

Signed and Sealed this

Twentieth Day of January, 1998

Attest:

BRUCE LEHMAN

*Attesting Officer*     *Commissioner of Patents and Trademarks*